United States Patent
Hirata et al.

(10) Patent No.: US 10,610,820 B2
(45) Date of Patent: Apr. 7, 2020

(54) FLUE GAS TREATMENT SYSTEM AND METHOD

(71) Applicants: MITSUBISHI HEAVY INDUSTRIES ENGINEERING, LTD., Yokohama-shi, Kanagawa (JP); MITSUBISHI HITACHI POWER SYSTEMS ENVIRONMENTAL SOLUTIONS, LTD., Yokohama-Shi, Kanagawa (JP)

(72) Inventors: Takuya Hirata, Tokyo (JP); Hiromitsu Nagayasu, Tokyo (JP); Yasutoshi Ueda, Tokyo (JP); Tomoki Noborisato, Tokyo (JP); Takao Tanaka, Hyogo (JP); Masaya Kato, Hyogo (JP)

(73) Assignees: MITSUBISHI HEAVY INDUSTRIES ENGINEERING, LTD., Kanagawa (JP); MITSUBISHI HITACHI POWER SYSTEMS ENVIRONMENTAL SOLUTIONS, LTD., Kanagawa (JP)

( * ) Notice: Subject to any disclaimer, the term of this patent is extended or adjusted under 35 U.S.C. 154(b) by 0 days.

(21) Appl. No.: 16/403,764

(22) Filed: May 6, 2019

(65) Prior Publication Data

US 2019/0255483 A1 Aug. 22, 2019

Related U.S. Application Data

(62) Division of application No. 15/533,460, filed as application No. PCT/JP2015/076954 on Sep. 24, 2015, now Pat. No. 10,328,383.

(30) Foreign Application Priority Data

Jan. 22, 2015 (JP) .................................. 2015-010715

(51) Int. Cl.
*B01D 53/14* (2006.01)
*B01D 53/18* (2006.01)
(Continued)

(52) U.S. Cl.
CPC .......... *B01D 53/14* (2013.01); *B01D 53/1475* (2013.01); *B01D 53/18* (2013.01);
(Continued)

(58) Field of Classification Search
CPC ...... B01D 2252/204; B01D 2258/0283; B01D 53/14; B01D 53/1475; B01D 53/18;
(Continued)

(56) References Cited

U.S. PATENT DOCUMENTS 6,117,404 A 9/2000 Mimura et al.
6,784,320 B2 8/2004 Mimura et al.
(Continued)

FOREIGN PATENT DOCUMENTS

EP 2 537 574 A1 12/2012
JP 3-193116 A 8/1991
(Continued)

OTHER PUBLICATIONS

Written Opinion of the International Searching Authority dated Nov. 2, 2015 issued in counterpart Application No. PCT/JP2015/076954, with English translation (13 pages).
(Continued)

*Primary Examiner* — Cabrena Holecek
(74) *Attorney, Agent, or Firm* — Westerman, Hattori, Daniels & Adrian, LLP

(57) ABSTRACT

Provided are: a wet desulfurization apparatus 13 which removes sulfur oxides in flue gas 12A from a boiler 11; a mist collection/agglomeration apparatus 14 which is provided on a downstream side of the desulfurization apparatus 13 and forms agglomerated $SO_3$ mist by causing particles of $SO_3$ mist contained in flue gas 12B from the wet desulfurization apparatus 13 to be bonded together and have bloated particle sizes; a $CO_2$ recovery apparatus 18 constituted by a $CO_2$ absorption tower 16 having a $CO_2$ absorption unit 16A
(Continued)

which removes $CO_2$ contained in flue gas 12D by being brought into contact with a $CO_2$ absorbent and an absorbent regeneration tower 17 which recovers $CO_2$ by releasing $CO_2$ from the $CO_2$ absorbent having absorbed $CO_2$ and regenerates the $CO_2$ absorbent; and a mist collection unit 16C which collects $CO_2$ absorbent bloated mist bloated by the $CO_2$ absorbent being absorbed by the agglomerated $SO_3$ mist in the $CO_2$ absorption unit 16A.

2 Claims, 6 Drawing Sheets

(51) Int. Cl.
*B01D 53/50* (2006.01)
*B01D 53/62* (2006.01)
*B01D 53/75* (2006.01)
*C01B 32/50* (2017.01)
*F23J 15/00* (2006.01)

(52) U.S. Cl.
CPC .......... *B01D 53/50* (2013.01); *B01D 53/504* (2013.01); *B01D 53/62* (2013.01); *B01D 53/75* (2013.01); *C01B 32/50* (2017.08); *F23J 15/00* (2013.01); *B01D 2252/204* (2013.01); *B01D 2258/0283* (2013.01); *Y02C 10/04* (2013.01); *Y02C 10/06* (2013.01); *Y02E 20/326* (2013.01)

(58) Field of Classification Search
CPC ...... B01D 53/50; B01D 53/504; B01D 53/62; B01D 53/75; C01B 32/50; F23J 15/00; Y02A 50/2342; Y02C 10/04; Y02C 10/06; Y02E 20/326
See application file for complete search history.

(56) References Cited

U.S. PATENT DOCUMENTS

| | | | |
|---|---|---|---|
| 7,316,737 | B2 | 1/2008 | Mimura et al. |
| 8,486,357 | B1 | 7/2013 | Ito et al. |
| 8,545,782 | B1 | 10/2013 | Tsujiuchi et al. |
| 9,381,461 | B2 | 7/2016 | Nagayasu et al. |
| 9,382,461 | B2 | 7/2016 | Boyce et al. |
| 2011/0011265 | A1 | 1/2011 | Paur et al. |
| 2012/0328501 | A1* | 12/2012 | Iijima ................ B01D 53/1475 423/228 |
| 2015/0139861 | A1 | 5/2015 | Nagayasu et al. |

FOREIGN PATENT DOCUMENTS

| | | |
|---|---|---|
| JP | 8-93438 A | 4/1996 |
| JP | 9-262432 A | 10/1997 |
| JP | 10-33938 A | 2/1998 |
| JP | 2002-126439 A | 5/2002 |
| JP | 2003-53134 A | 2/2003 |
| JP | 2006-218415 A | 8/2006 |
| JP | 2008-238114 A | 10/2008 |
| JP | 2009-226367 A | 10/2009 |
| JP | 2013-006129 A | 1/2013 |
| JP | 2014-500 A | 1/2014 |
| WO | 2008/038348 A1 | 4/2008 |
| WO | 2011/152547 A1 | 12/2011 |

OTHER PUBLICATIONS

Extended (supplementary) European Search Report dated Nov. 2, 2017, issued in counterpart European Application No. 15878861.2. (9 pages).

Office Action dated May 17, 2018, issued in counterpart Canadian Application No. 2969190. (4 pages).

* cited by examiner

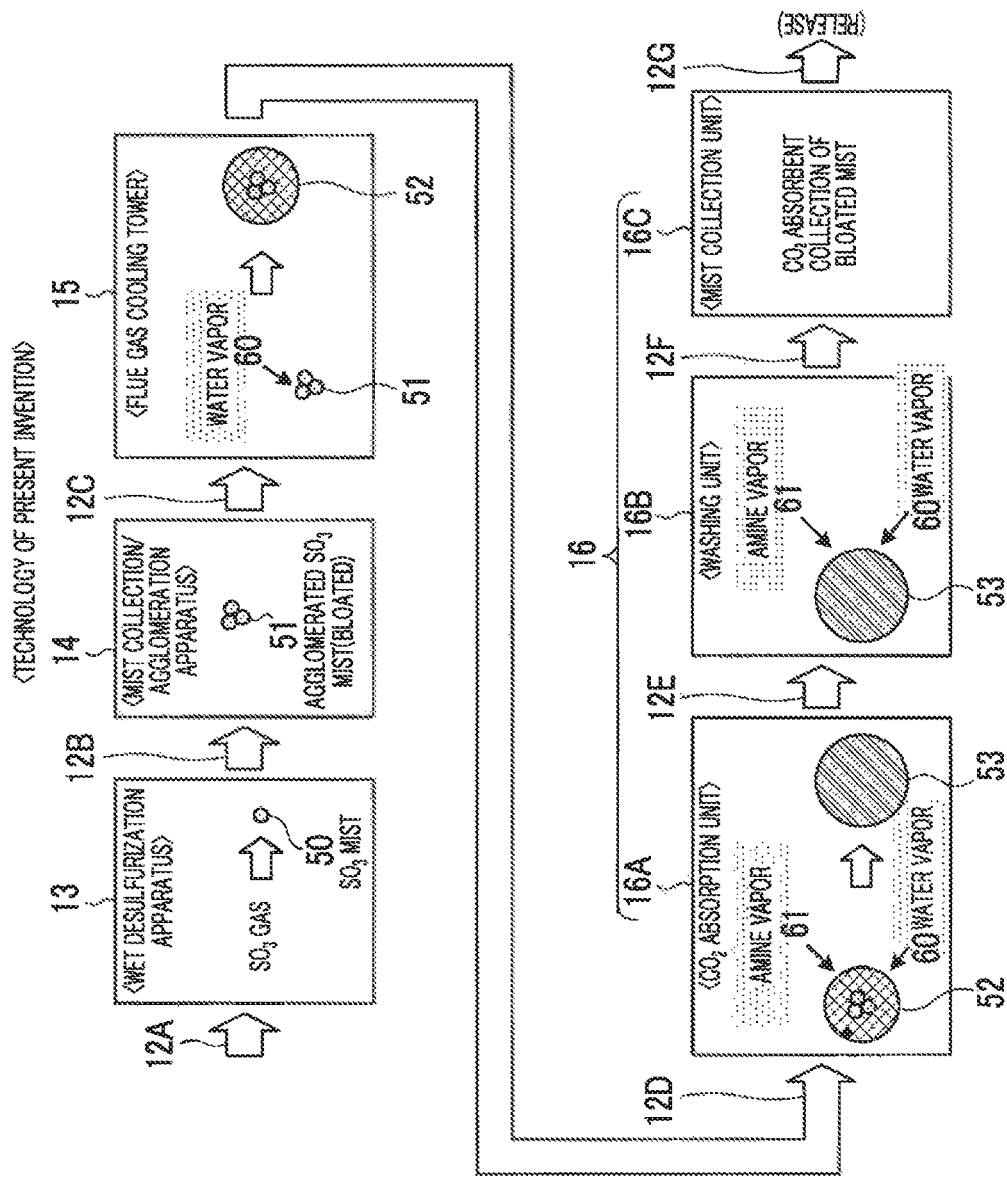

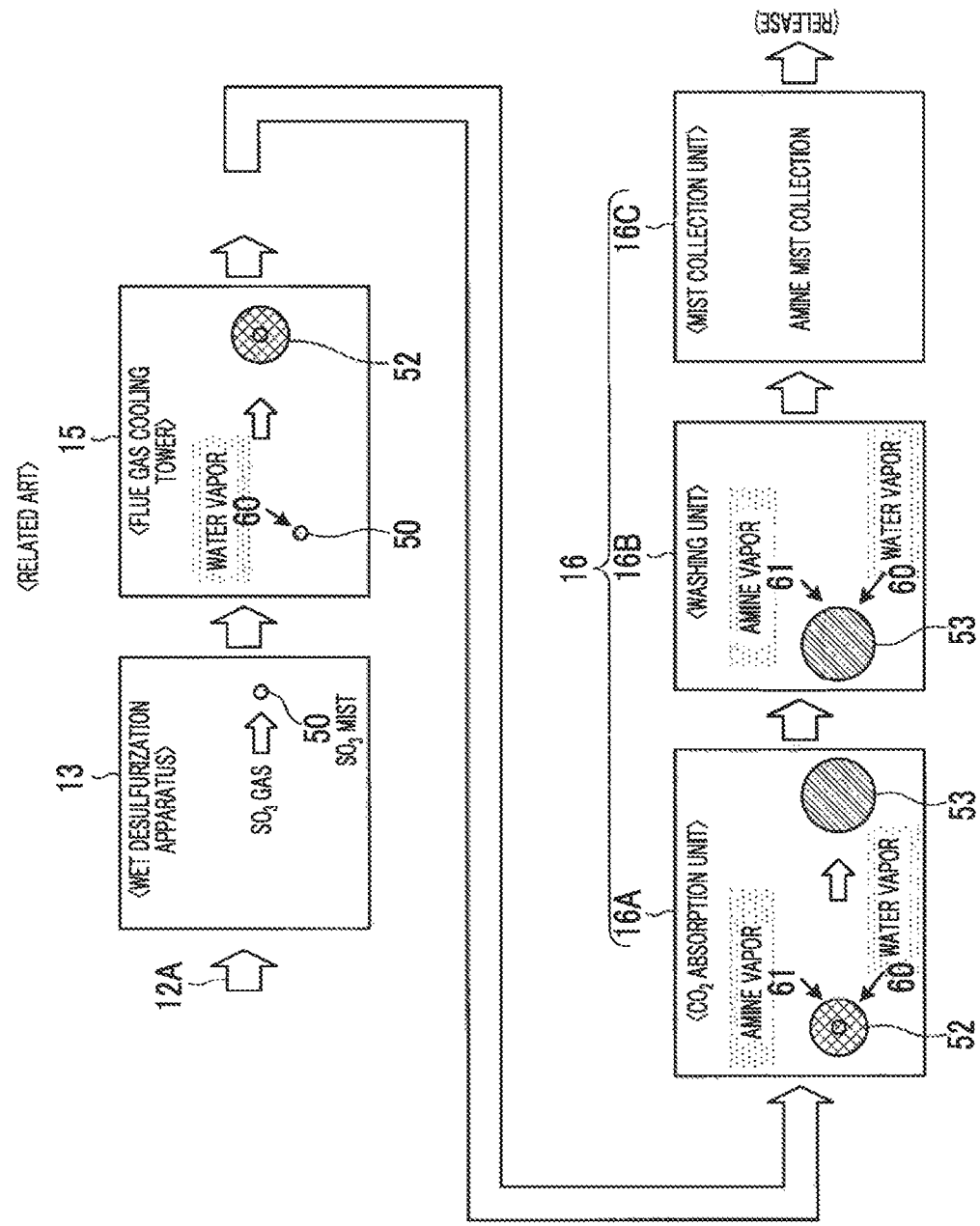

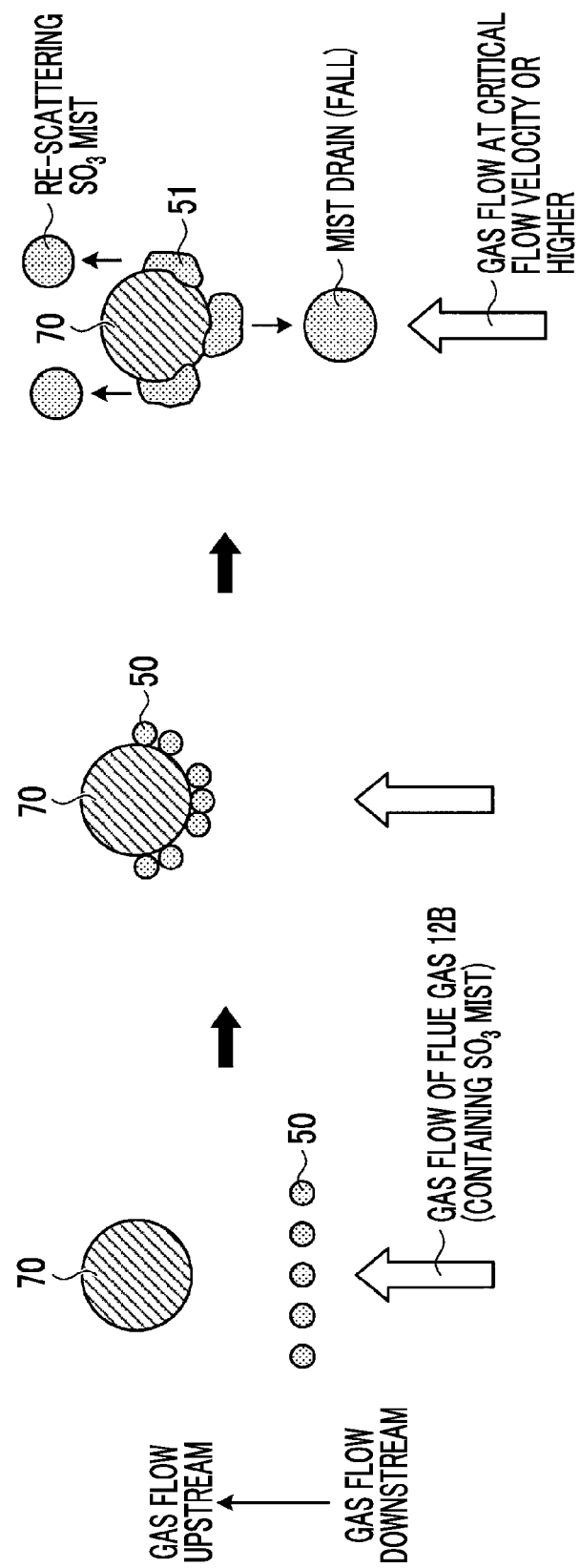

FLUE GAS TREATMENT SYSTEM AND METHOD

CROSS-REFERENCE TO RELATED APPLICATION

This application is a divisional of U.S. application Ser. No. 15/533,460, filed on Jun. 6, 2017, and wherein U.S. application Ser. No. 15/533,460 is a national stage application filed under 35 U.S.C. § 371 of International Application No. PCT/JP2015/076954, filed Sep. 24, 2015, which is based upon and claims the benefit of priority of the prior Japanese Patent Application No. 2015-010715, filed on Jan. 22, 2015, the entire contents of which are incorporated herein by reference.

TECHNICAL FIELD

The present invention relates to a flue gas treatment system and a method in which the discharge of an amine absorbent to the outside of a system is significantly suppressed when $CO_2$ in flue gas is absorbed and removed by the amine absorbent.

BACKGROUND ART

In recent years, as one of causes of the global warming phenomenon, the greenhouse effect by $CO_2$ has been pointed out, and countermeasures to protect the global environment have become urgent tasks internationally. $CO_2$ generation sources include all human activity fields in which fossil fuels are burned, and there is a tendency for the demand for suppression of the discharge to be further strengthened. Accordingly, for power generation facilities such as thermal power plants that use large amounts of fossil fuels, methods of removing and recovering $CO_2$ in combustion flue gas by bringing the combustion flue gas in industrial facilities such as a boiler or gas turbine into contact with an amine-based $CO_2$ absorbent, and flue gas treatment systems for storing the recovered $CO_2$ without release to the air have been studied vigorously.

As a process for removing and recovering $CO_2$ from the combustion flue gas by using the above-mentioned amine-based $CO_2$ absorbent, a $CO_2$ recovery apparatus having a process for bringing combustion flue gas and the $CO_2$ absorbent into contact with each other in a $CO_2$ absorption tower (hereinafter, also simply referred to as "absorption tower"), and a process for heating the $CO_2$ absorbent having absorbed $CO_2$ in a $CO_2$ absorbent regeneration tower (hereinafter, also simply referred to as "regeneration tower") to cause $CO_2$ to diffuse, regenerating the $CO_2$ absorbent to be returned to the $CO_2$ absorption tower for reuse is suggested (for example, refer to PTL 1).

In the $CO_2$ absorption tower, $CO_2$ in the flue gas is absorbed by the $CO_2$ absorbent during countercurrent contact through a chemical reaction (exothermic reaction) by using the amine-based $CO_2$ absorbent such as alkanolamines, and the flue gas from which $CO_2$ has been removed is released to the outside of the system. The $CO_2$ absorbent having absorbed $CO_2$ is also called a rich solution. The rich solution is pressurized by a pump, is heated in a heat exchanger by a high-temperature $CO_2$ absorbent (lean solution) which is regenerated by the diffuse of $CO_2$ in the regeneration tower, and is supplied to the regeneration tower.

In the $CO_2$ recovery process using the $CO_2$ absorbent, $CO_2$-removed flue gas from which $CO_2$ has been removed from the combustion flue gas is released to the air. However, since an extremely small portion of a small amount of the amine absorbent is present in the released gas, it is necessary to reduce the amount thereof discharged.

Particularly in the future, when regulations on $CO_2$ removal are started, there is a possibility that a $CO_2$ removal facility itself may increase in size, and it is necessary to further reduce the amount thereof discharged.

As a technique for preventing the release of the amine absorbent, for example, a method in which a plurality of stages of washing units are provided on the downstream side of a $CO_2$ absorption unit of a $CO_2$ absorption tower of a $CO_2$ removal apparatus to bring $CO_2$-removed flue gas and washing water into gas-liquid contact with each other, thereby recovering an amine compound entrained in the $CO_2$-removed flue gas (PTL 2) is suggested.

In addition, as another technique, a method in which sulfuric acid is sprayed from a sulfuric acid spraying device toward $CO_2$-removed flue gas discharged from a $CO_2$ absorption tower to cause an amine absorbent entrained in the discharged gas to become a basic amine compound sulfate, and a basic amine compound in gas discharged from a decarbonator that collects the basic amine compound sulfate is recovered, is suggested (PTL 3).

Furthermore, in the flue gas treatment system, there is a problem that in a case where mist generating substances which are generation sources of mist generated in an absorption tower in a $CO_2$ recovery apparatus are contained in flue gas introduced into a $CO_2$ absorption tower, that absorbs $CO_2$, in the $CO_2$ recovery apparatus, a $CO_2$ absorbent contains the mist generating substances entrained therein, and thus the amount of the $CO_2$ absorbent scattering toward the outside of the system increases. Therefore, countermeasures against this have been studied (PTL 4).

CITATION LIST

Patent Literature

[PTL 1] Japanese Unexamined Patent Application Publication No. 3-193116
[PTL 2] Japanese Unexamined Patent Application Publication No. 2002-126439
[PTL 3] Japanese Unexamined Patent Application Publication No. 10-33938
[PTL 4] International Publication No. WO2011/152547

SUMMARY OF INVENTION

Technical Problem

However, in the above-described suggestions, although the gaseous amine absorbent in the $CO_2$-removed flue gas released from the $CO_2$ absorption tower can be reduced, there is concern that the mist-like amine absorbent may be released together with the flue gas. Accordingly, this needs to be suppressed.

When the mist-like amine absorbent is released to the outside of the system, there is a problem that the amount of the $CO_2$ absorbent that can be originally used for $CO_2$ removal in the $CO_2$ absorption tower is reduced and needs to be replenished. Therefore, it is desired to establish a flue gas treatment system and a method capable of further suppressing the release of amine compounds entrained in the flue gas.

An object of the present invention is to provide a flue gas treatment system and a method capable of significantly suppressing entrainment of a $CO_2$ absorbent when treated flue gas from which $CO_2$ has been removed is discharged to the outside of a system.

Solution to Problem

A first invention of the present invention to solve the problems is a flue gas treatment system including: a desulfurization apparatus which removes sulfur oxides in flue gas from a boiler; a mist collection/agglomeration apparatus which is provided on a downstream side of the desulfurization apparatus and forms agglomerated and bloated mist by causing particles of mist contained in the flue gas to be bonded together and have bloated particle sizes; a $CO_2$ recovery apparatus constituted by a $CO_2$ absorption tower having a $CO_2$ absorption unit which removes $CO_2$ contained in the flue gas by being brought into contact with a $CO_2$ absorbent and an absorbent regeneration tower which recovers $CO_2$ by releasing $CO_2$ from the $CO_2$ absorbent having absorbed $CO_2$ and regenerates the $CO_2$ absorbent; and a mist collection unit which is provided on a gas flow downstream side of the $CO_2$ absorption unit and collects $CO_2$ absorbent bloated mist bloated by the $CO_2$ absorbent being absorbed by the agglomerated and bloated mist in the $CO_2$ absorption unit.

In the first invention, a second invention is the flue gas treatment system in which a flow velocity of the flue gas in the mist collection/agglomeration apparatus exceeds a critical filtration wind velocity for mist collection.

In the first or second invention, a third invention is the flue gas treatment system further including: a washing unit provided between the $CO_2$ absorption unit and the mist collection unit.

In any one of the first to third inventions, a fourth invention is the flue gas treatment system in which the mist collection/agglomeration apparatus causes the mist to be bloated by a wire mesh.

In any one of the first to third inventions, a fifth invention is the flue gas treatment system in which the mist collection/agglomeration apparatus causes the mist to be bloated through charging.

A sixth invention is a flue gas treatment method including: forming agglomerated and bloated mist by causing particles of mist contained in flue gas from a wet desulfurization apparatus, which removes sulfur oxides in the flue gas from a boiler, to be bonded together and have bloated particle sizes; causing the agglomerated and bloated mist to re-scatter and be introduced to a $CO_2$ absorption unit side which removes $CO_2$ by bringing a $CO_2$ absorbent on a gas flow downstream side into contact therewith; when $CO_2$ contained in the flue gas is removed by being brought into contact with the $CO_2$ absorbent, forming $CO_2$ absorbent bloated mist bloated by the $CO_2$ absorbent being absorbed by the agglomerated and bloated mist; and collecting the $CO_2$ absorbent bloated mist by a mist collection unit.

In the sixth invention, a seventh aspect is the flue gas treatment method in which a flow velocity of the flue gas containing the re-scattering agglomerated and bloated mist exceeds a critical filtration wind velocity for mist collection.

Advantageous Effects of Invention

According to the present invention, by the mist collection/agglomeration apparatus, agglomerated and bloated mist is formed by causing particles of mist contained in the flue gas from the desulfurization apparatus to be bonded together and have bloated particle sizes, the agglomerated and bloated mist is caused to re-scatter and be introduced to the $CO_2$ absorption unit side which removes $CO_2$ by bringing the $CO_2$ absorbent on the gas flow downstream side into contact therewith. Thereafter, when $CO_2$ contained in the flue gas is removed by being brought into contact with the $CO_2$ absorbent, $CO_2$ absorbent bloated mist bloated by the $CO_2$ absorbent being absorbed by the agglomerated and bloated mist as the nucleus is formed, and the $CO_2$ absorbent bloated mist can be collected by the mist collection unit. Accordingly, when the treated flue gas from which $CO_2$ has been removed is discharged to the outside of the system, entrainment of the $CO_2$ absorbent can be significantly suppressed.

BRIEF DESCRIPTION OF DRAWINGS

FIG. 2A is a schematic view illustrating a mechanism for bloating mist according to the present invention.

FIG. 2B is a schematic view illustrating a mechanism for bloating mist according to the related art.

FIG. 3 is a schematic view of mist bloating according to the present invention.

DESCRIPTION OF EMBODIMENTS

Hereinafter, preferred examples of the present invention will be described in detail with reference to the accompanying drawings. In addition, the present invention is not limited by the examples, and in a case where there are a plurality of examples, a combination of the examples is also included.

Example 1

Figure 1:
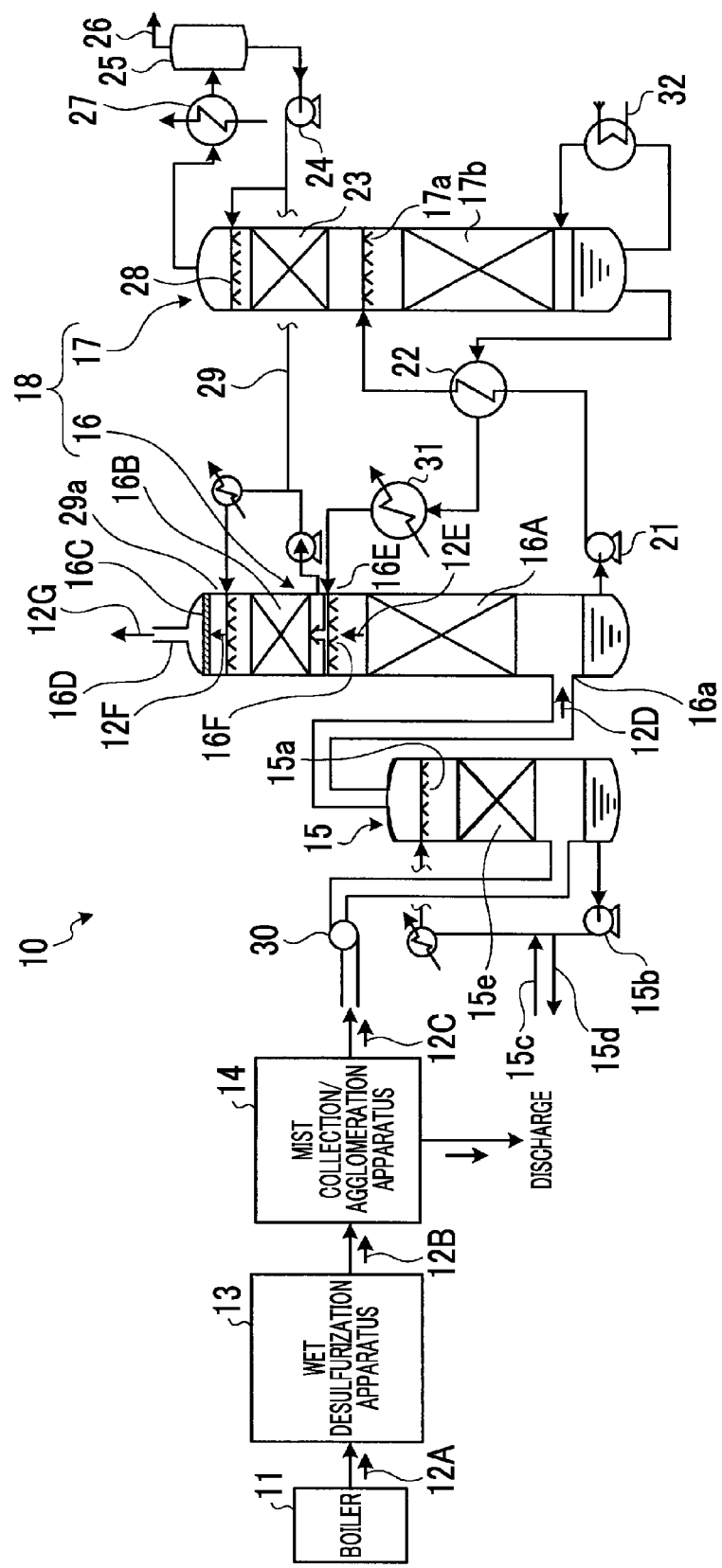
FIG. 1 is a schematic view of a flue gas treatment system according to Example 1.

FIG. 1 is a schematic view of a flue gas treatment system according to Example 1. As illustrated in FIG. 1, a flue gas treatment system 10 according to this example includes: a wet desulfurization apparatus 13 which removes sulfur oxides in flue gas 12A from a boiler 11; a mist collection/agglomeration apparatus 14 which is provided on the downstream side of the desulfurization apparatus 13 and forms agglomerated $SO_3$ mist 51 which is agglomerated and bloated mist by causing particles of $SO_3$ mist 50 contained in flue gas 12B from the wet desulfurization apparatus 13 to be bonded together and have bloated particle sizes; a flue gas cooling tower 15 which cools flue gas 12C from the mist collection/agglomeration apparatus 14; a $CO_2$ recovery apparatus 18 constituted by a $CO_2$ absorption tower 16 having a $CO_2$ absorption unit 16A which removes $CO_2$ contained in flue gas 12D from the flue gas cooling tower 15 by being brought into contact with a $CO_2$ absorbent and an absorbent regeneration tower 17 which recovers $CO_2$ by releasing $CO_2$ from the $CO_2$ absorbent having absorbed $CO_2$ and regenerates the $CO_2$ absorbent; a washing unit 16B which is provided on the gas flow downstream side of the $CO_2$ absorption unit 16A and washes flue gas 12E; and a mist collection unit 16C which is provided on the gas flow downstream side of the washing unit 16B and collects $CO_2$ absorbent bloated mist 53 bloated by the $CO_2$ absorbent being absorbed by the agglomerated $SO_3$ mist 51 in the $CO_2$ absorption unit 16A and the washing unit 16B. In addition, the behavior of the mist (the $SO_3$ mist 50, the agglomerated $SO_3$ mist 51, and the $CO_2$ absorbent bloated mist 53) will be described later with reference to FIGS. 2A and 2B.

Here, in this example, the $SO_3$ mist exemplifies the mist. However, the present invention is not limited thereto, and for example, fine mist or the like generated by causing moisture to adhere to solid particles such as fine coal ash may be exemplified.

Here, in the flue gas treatment system according to this example, $CO_2$ in the combustion flue gas exemplifies an object to be removed. In FIG. 1, only main facilities are illustrated, and accessory facilities are omitted. In FIG. 1, reference numeral 12G denotes a purified flue gas, 16D denotes a decarbonated combustion flue gas discharge port, 16E denotes an absorbent supply port, 16F denotes a liquid distributor, 15a denotes a cooling water liquid distributor, 15b denotes a cooling water circulation pump, 15c denotes a make-up water supply line, 15d denotes a drainage discharge line, 21 denotes a discharge pump for the absorbent having absorbed $CO_2$, 22 denotes a heat exchanger, 17 denotes an absorbent regeneration tower, 17a is a liquid distributor, 23 denotes an upper filling unit, 24 denotes a reflux water pump, 25 denotes a $CO_2$ separator, 26 denotes a recovered $CO_2$ discharge line, 27 denotes a regeneration tower reflux cooler, 28 denotes a nozzle, 29 denotes a regeneration tower reflux water supply line, 30 denotes a combustion flue gas supply blower, 31 denotes a cooler, and 32 denotes a regeneration heater (reboiler).

In FIG. 1, sulfur oxides in the flue gas 12A are removed from the flue gas 12A from the boiler 11 by the wet desulfurization apparatus 13, and the flue gas 12B from the desulfurization apparatus 13 is introduced into the mist collection/agglomeration apparatus 14. Here, particles of $SO_3$ mist are agglomerated and bloated, thereby forming agglomerated $SO_3$ mist. Thereafter, the flue gas 12C containing the agglomerated $SO_3$ mist is pushed into the flue gas cooling tower 15 by the combustion flue gas supply blower 30, and is cooled by being brought into contact with the cooling water from the cooling water liquid distributor 15a in a filling unit 15e. Next, the cooled flue gas 12D is guided into the $CO_2$ absorption tower 16 through a combustion flue gas supply port 16a of the $CO_2$ absorption tower 16. Cooling water contacting the flue gas 12C accumulates in the lower portion of the flue gas cooling tower 15 and circulates to the cooling water liquid distributor 15a by the cooling water circulation pump 15b so as to be used. Here, in a case where the amount of moisture in the flue gas 12B is small, the cooling water is gradually lost by humidifying and cooling the combustion flue gas. Accordingly, cooling water is replenished by the make-up water supply line 15c. In a case where the amount of moisture in the flue gas 12B is large, moisture in the combustion flue gas condenses due to contact with the cooling water and causes an increase in the amount of the cooling water. Accordingly, excess waste water is discharged by the drainage discharge line 15d.

Next, the flue gas 12D pushed into the $CO_2$ absorption tower 16 is brought into countercurrent contact with the $CO_2$ absorbent at a constant concentration supplied from the liquid distributor 16F in the filling unit in the $CO_2$ absorption unit 16A, $CO_2$ in the flue gas 12D is absorbed and removed by the absorbent, and the decarbonated flue gas 12E is directed to the washing unit 16B on the gas flow downstream side. The absorbent supplied to the $CO_2$ absorption tower 16 absorbs $CO_2$ and typically reaches a temperature higher than the temperature at the combustion flue gas supply port 16a due to the heat of reaction caused by the absorption, and is sent to the heat exchanger 22 by the discharge pump 21 for the absorbent having the absorbed $CO_2$ so as to be heated and guided to the absorbent regeneration tower 17. Temperature control of the regenerated absorbent can be performed by the heat exchanger 22 or, if necessary, by the cooler 31 provided between the heat exchanger 22 and the absorbent supply port 16E.

In the absorbent regeneration tower 17, the absorbent is regenerated in a lower filling unit 17b through heating by the regeneration heater (reboiler) 32, is cooled by the heat exchanger 22, and is returned to the $CO_2$ absorption tower 16 side. In the upper portion of the absorbent regeneration tower 17, $CO_2$ separated from the absorbent comes into contact with reflux water supplied from the nozzle 28 in the upper filling unit 23, is cooled by the regeneration tower reflux cooler 27, is separated from the reflux water having condensed water vapor with $CO_2$ entrained therein by the $CO_2$ separator 25, and is guided to a $CO_2$ recovery process by the recovered $CO_2$ discharge line 26.

A portion of the reflux water is refluxed to the absorbent regeneration tower 17 by the reflux water pump 24, and the portion is supplied to the regeneration tower reflux water supply port 29a of the $CO_2$ absorption tower 16 via the regeneration tower reflux water supply line 29. Since the amount of the absorbent contained in the regenerated reflux water is small, the absorbent comes into contact with the flue gas in the washing unit 16B of the $CO_2$ absorption tower 16 and contributes to the recovery of a small amount of absorbent contained in the decarbonated combustion flue gas 12E.

FIG. 2A is a schematic view illustrating a mechanism for bloating mist according to the present invention. FIG. 2B is a schematic view illustrating a mechanism for bloating mist according to the related art.

First, as illustrated in FIG. 2A, in the flue gas 12A from the boiler 11 introduced into the wet desulfurization apparatus 13, the $SO_3$ mist 50 is generated from a portion of $SO_3$ gas in the desulfurization apparatus 13.

The generated $SO_3$ mist 50 is contained in the flue gas 12B discharged from the desulfurization apparatus 13. The $SO_3$ mist 50 in the flue gas 12B introduced into the mist collection/agglomeration apparatus 14 provided on the downstream side of the desulfurization apparatus 13 adheres to, for example, a wire mesh, agglomerates, and bloats to form the agglomerated $SO_3$ mist 51.

The flue gas 12C containing the agglomerated $SO_3$ mist 51 bloated in the mist collection/agglomeration apparatus 14 is then introduced into the flue gas cooling tower 15. In the flue gas cooling tower 15, the agglomerated $SO_3$ mist 51 absorbs water vapor 60 in the flue gas cooling tower 15 and becomes dilute sulfuric acid, thereby forming dilute sulfuric acid mist 52 with the agglomerated $SO_3$ mist 51 as the nucleus.

The flue gas 12D containing the dilute sulfuric acid mist 52 with the agglomerated $SO_3$ mist 51 bloated in the flue gas cooling tower 15 as the nucleus is then introduced into the $CO_2$ absorption unit 16A in the $CO_2$ absorption tower 16.

The dilute sulfuric acid mist 52 with the agglomerated $SO_3$ mist 51 in the flue gas introduced into the $CO_2$ absorption unit 16A as the nucleus absorbs amine vapor 61 in a case where the water vapor 60 in the $CO_2$ absorption unit 16A and an amine compound as the $CO_2$ absorbent are used, and forms the $CO_2$ absorbent bloated mist 53 which contains a high concentration of amine and is thus bloated.

The flue gas 12E containing the $CO_2$ absorbent bloated mist 53 bloated in the $CO_2$ absorption unit 16A is then introduced into the washing unit 16B.

In the washing unit 16B, the $CO_2$ absorbent bloated mist 53 which contains a high concentration of amine and is thus bloated is formed by further absorbing the water vapor 60 and the amine vapor 61 in the washing unit 16B.

A demister provided with a wire mesh is used in the mist collection unit 16C on the outlet side in the $CO_2$ absorption tower 16, and the bloated $CO_2$ absorbent bloated mist 53 is collected by the demister.

Contrary to this, in the related art, as illustrated in FIG. 2B, the mist collection/agglomeration apparatus 14 as in this example is not provided, and thus the size of the nucleus forming dilute sulfuric acid mist in the flue gas cooling tower 15 is small. As a result, even in a case where there is bloating due to the $CO_2$ absorbent in the $CO_2$ absorption tower 16, $CO_2$ absorbent bloated mist 53 which is smaller than that in the case of the present invention is formed. In the mist collection unit 16C on the outlet side in the $CO_2$ absorption tower 16, the efficiency of the demister provided with the wire mesh in collecting the bloated $CO_2$ absorbent bloated mist 53 is low.

Table 1 shown below shows the outlet mist particle size of the desulfurization apparatus 13, the outlet mist particle size of the mist collection/agglomeration apparatus 14, and the inlet mist particle size of the mist collection unit 16C in the related art and Example 1.

In the related art, since the mist collection/agglomeration apparatus 14 is not installed, the $SO_3$ mist 50 (particle size 0.1 to 1.0 μm) at the outlet of the desulfurization apparatus 13 becomes the nucleus, is introduced into the $CO_2$ absorption unit 16A, and is bloated herein such that the inlet mist particle size of the mist collection unit 16C was 0.5 to 2.0 μm.

Contrary to this, in Example 1, since the mist collection/agglomeration apparatus 14 is installed, in a case where two particles of mist having an outlet mist particle size of 0.1 to 1.0 μm for the desulfurization apparatus 13 agglomerate, the outlet mist particle size of the mist collection/agglomeration apparatus 14 is bloated to become 0.12 to 1.2 μm. The agglomerated $SO_3$ mist 51 with the two agglomerating particles of mist becomes the nucleus, is introduced into the $CO_2$ absorption unit 16A, and is bloated herein such that the inlet mist particle size of the mist collection unit 16C was 0.6 to 2.3 μm.

In addition, in a case where, for example, five particles of mist having an outlet mist particle size of 0.1 to 1.0 μm for the desulfurization apparatus 13 agglomerate, the outlet mist particle size of the mist collection/agglomeration apparatus 14 is bloated to become 0.17 to 1.7 μm. The agglomerated $SO_3$ mist 51 with the five agglomerating particles of mist becomes the nucleus, is introduced into the $CO_2$ absorption unit 16A, and is bloated herein such that the inlet mist particle size of the mist collection unit 16C was 0.7 to 2.9 μm.

As a result, according to Example 1, the collection efficiency in the mist collection unit 16C could be improved.

TABLE 1

| | | Example 1 | |
|---|---|---|---|
| | Related art | Two particles of mist agglomerated | Five particles of mist agglomerated |
| Outlet mist particle size of desulfurization apparatus 13 | 0.1 to 1.0 μm | 0.1 to 1.0 μm | 0.1 to 1.0 μm |
| Outlet mist particle size of mist collection/ agglomeration apparatus 14 | — | 0.12 to 1.2 μm | 0.17 to 1.7 μm |
| Inlet mist particle size of mist collection unit 16C | 0.5 to 2.0 μm | 0.6 to 2.3 μm | 0.7 to 2.9 μm |

The reason why the removing means using the wire mesh is selected as the mist collection/agglomeration apparatus 14 will be described below in Table 2.

In a case where mist removal is performed, hitherto, a mist removal apparatus which uses dense filter fabric such as a candle filter using the Brownian diffusion principle is suitable to remove fine mist of several micrometers or smaller. However, it is necessary to perform an operation at a low filtration wind velocity, resulting in an increase in the size of the apparatus, which is not preferable.

In addition, in a case where a corrugated mist removal apparatus is used, it is possible to perform an operation at a high filtration wind velocity, and thus a reduction in the size of the apparatus is possible. However, the inertial forces of fine particles decrease in proportion to mass, and the mist removal efficiency decreases. Therefore, it is not preferable in practice to use the corrugated mist removal apparatus for removing fine particles.

Therefore, the removing means using the wire mesh is preferable as the mist collection/agglomeration apparatus 14.

TABLE 2

| Type | Principle | Object particle size [μm] | Filtration wind velocity [m/s] | Evaluation |
|---|---|---|---|---|
| Corrugated mist removal apparatus | Inertial impaction | 20≤ | 2 to 4.5 | x |
| Wire mesh | Interception | 3 to 20 | 1.3 to 3.5 | o |
| Filtration fabric (candle filter) | Brownian diffusion | ≤3 | 0.03 to 0.2 | x |

FIG. 3 is a schematic view of mist bloating according to the present invention. In addition, in FIG. 3, the lower side of the figure is the gas flow downstream side and the upper side of the figure is the gas flow upstream side. As illustrated in FIG. 3, in a case where a wire mesh 70 is used as the mist collection/agglomeration apparatus 14, particles of the $SO_3$ mist 50 adhered to the surface of the wire mesh 70 come into contact with each other and agglomerate, thereby forming the agglomerated $SO_3$ mist 51. In addition, the agglomerated $SO_3$ mist 51 flows downward along the wire mesh 70, and falls dropwise from the vicinity of the lower end portion of the wire mesh 70 as a mist drain to be discharged from the mist collection/agglomeration apparatus 14.

Here, in a case where the filtration wind velocity of the flue gas 12B is set to be equal to or higher than a wind velocity value regarded as the limit during typical mist collection, downflow and falling of the agglomerated $SO_3$ mist 51 are partially disturbed and re-scattering thereof from the upper surface side of the wire mesh 70 occurs, resulting in a reduction in the mist removal efficiency. Therefore, the filtration wind velocity regarded as the limit in the wire mesh type mist removal apparatus is, for example, 2.5 to 5 m/s (varies depending on the mist load in the gas and the wire mesh type).

Figure 4:
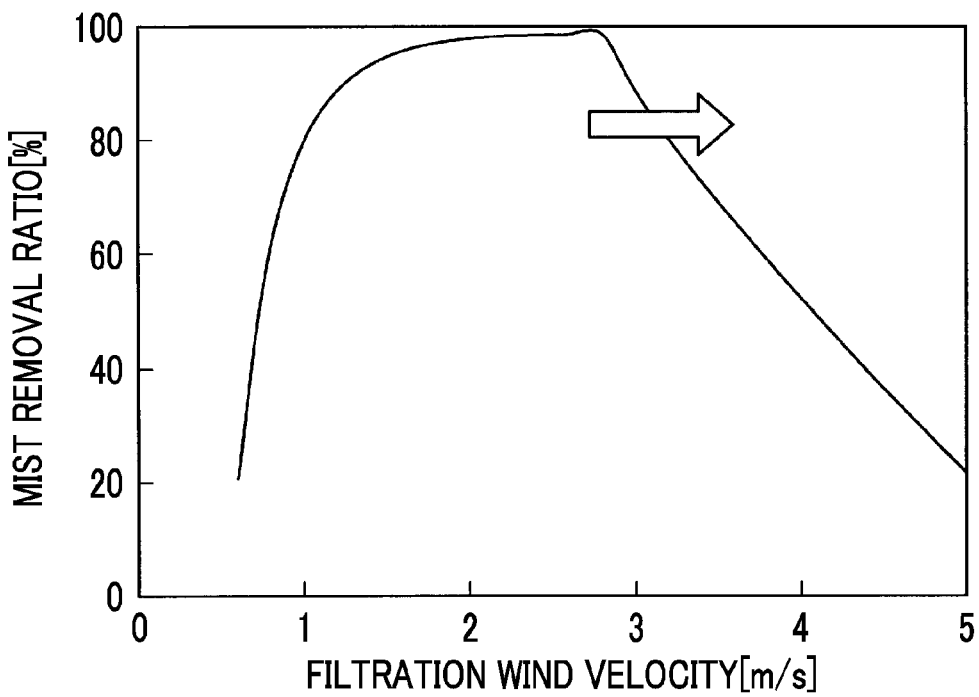
FIG. 4 is a diagram showing an example of the relationship between a filtration wind velocity and a mist removal ratio.
Figure 5:
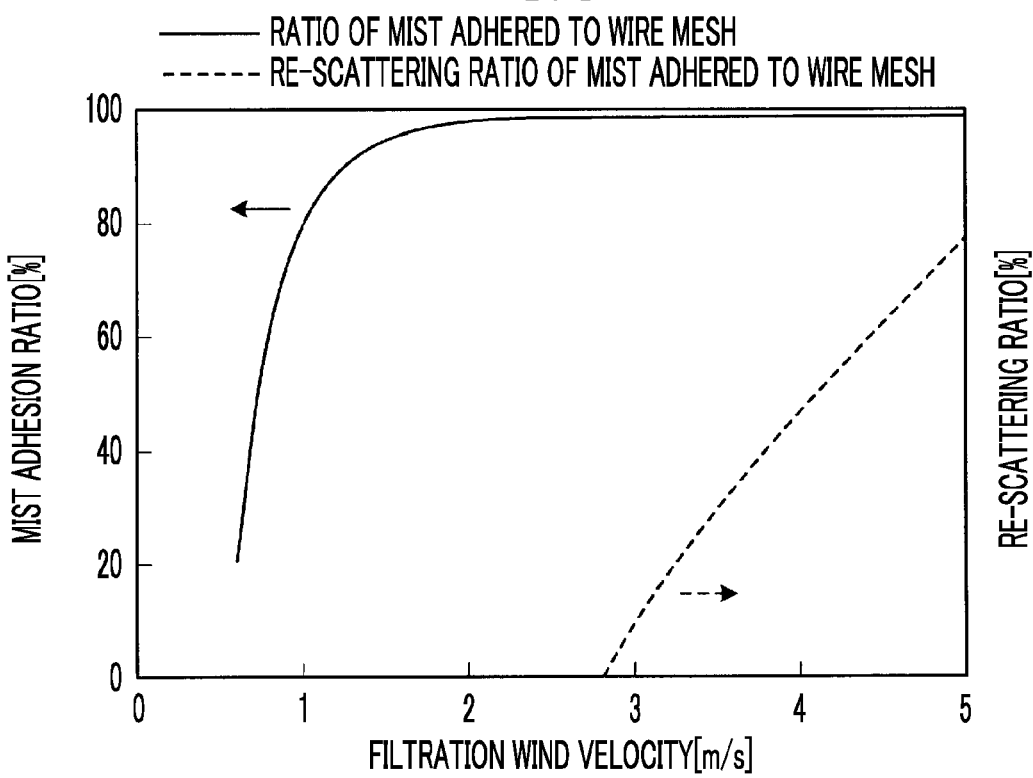
FIG. 5 is a diagram showing an example of the relationship between the filtration wind velocity, a mist adhesion ratio, and a mist re-scattering ratio.

FIG. 4 is a diagram showing an example of the relationship between the filtration wind velocity and the mist removal ratio. FIG. 5 is a diagram showing an example of the relationship between the filtration wind velocity, the mist adhesion ratio, and the mist re-scattering ratio.

In the example shown in FIG. 4, the mist removal ratio increases as the filtration wind velocity increases until the filtration wind velocity approaches, for example, 2.8 m/s. However, when the filtration wind velocity exceeds 2.8 m/s, re-scattering of the $SO_3$ mist collected by the wire mesh 70 and aggregated starts.

Furthermore, as shown in FIG. 5, the re-scattering ratio of the $SO_3$ mist adhered to the wire mesh 70 increases from the vicinity of the critical filtration wind velocity (for example, 2.8 m/s).

In a region of higher than the critical filtration wind velocity (for example, 2.8 m/s), the amount of the re-scattering agglomerated $SO_3$ mist 51 increases as the filtration wind velocity increases, and accordingly, as shown in FIG. 4, the mist removal ratio of the wire mesh (mist removal apparatus) 70 decreases.

However, agglomeration of the mist adhered to the wire mesh 70 occurs, and the particle size of the re-scattering mist is greater than the particle size of the inflow mist. Therefore, the re-scattering agglomerated $SO_3$ mist 51 becomes the nucleus and is further bloated in the $CO_2$ absorption tower 16, so that the mist recovery ratio of the demister which is the mist collection unit 16C installed at the outlet of the $CO_2$ absorption tower 16 is improved. As a result, the amount of mist accompanying the $CO_2$ absorbent and scattering to the outside of the system can be reduced.

As described above, as the filtration wind velocity (V) of the flue gas in the mist collection/agglomeration apparatus 14, a wind velocity (for example, V>2.5 m/s) which exceeds the filtration critical wind velocity (for example, 2.5 m/s) for the mist collection or a wind velocity of 1.2 to 1.5 times the filtration critical wind velocity is preferable.

Here, since the filtration wind velocity in the mist collection/agglomeration apparatus 14 varies depending on the mist load in the flue gas and the wire mesh type, in an actual apparatus, it is preferable to set the wind velocity to a wind velocity of 1.2 to 1.5 times the filtration critical wind velocity after the critical filtration wind velocity is determined.

According to this example, by the mist collection/agglomeration apparatus 14, the agglomerated $SO_3$ mist 51 which is agglomerated and bloated mist is formed by causing the particles of the $SO_3$ mist 50 contained in the flue gas 12B from the desulfurization apparatus 13 to be bonded together and have bloated particle sizes, the agglomerated $SO_3$ mist 51 is caused to re-scatter and be introduced to the $CO_2$ absorption unit 16A side which removes $CO_2$ by bringing the $CO_2$ absorbent on the gas flow downstream side into contact therewith. Thereafter, in the $CO_2$ absorption unit 16A, when $CO_2$ contained in the flue gas is removed by being brought into contact with the $CO_2$ absorbent, the $CO_2$ absorbent bloated mist 53 bloated by the $CO_2$ absorbent being absorbed by the agglomerated $SO_3$ mist 51 as the nucleus is formed, and the $CO_2$ absorbent bloated mist 53 can be collected by the mist collection unit 16C. Accordingly, when the treated flue gas from which $CO_2$ has been removed is discharged to the outside of the system, entrainment of the $CO_2$ absorbent can be significantly suppressed.

Example 2

Figure 6:
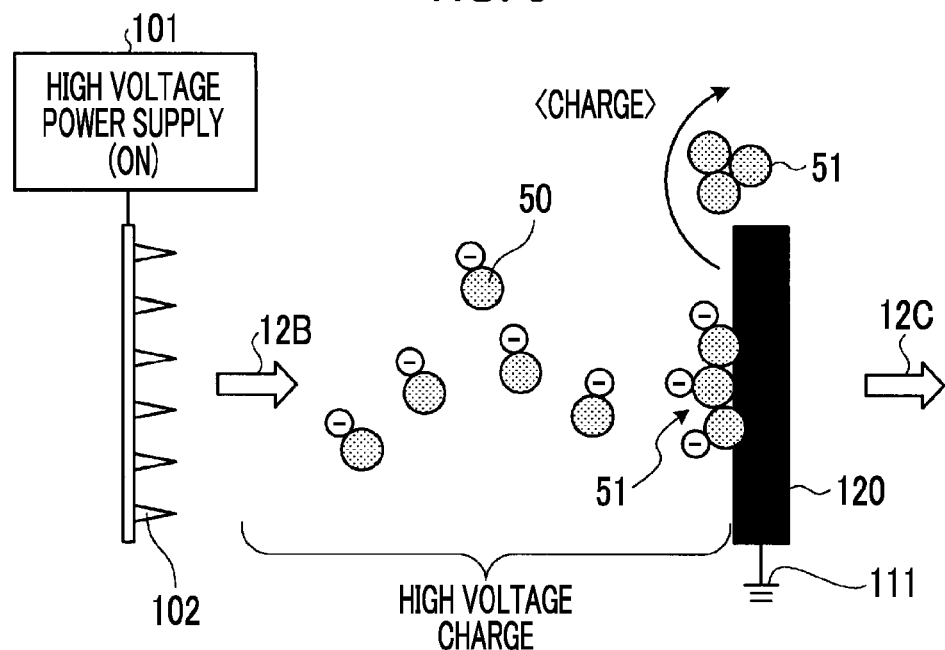
FIG. 6 is a schematic view of mist bloating caused by charging.

A flue gas treatment system according to Example 2 will be described below. In this example, the mist collection/agglomeration apparatus 14 of Example 1 is caused to bloat mist through charging. FIG. 6 is a schematic view of mist bloating caused by charging. As illustrated in FIG. 6, in this example, $SO_3$ mist is charged by using a discharge electrode 102 provided with a high voltage power supply 101.

In this example, as the mist collection/agglomeration apparatus 14 using charging, there are the discharge electrode 102 for charging the $SO_3$ mist 50 and a low pressure loss filter 120 which is grounded 111. The $SO_3$ mist 50 charged by using electrostatic force electrically neutralizes the adhered $SO_3$ mist in order to prevent repulsion due to the electrostatic force between particles of the mist adhered to the low pressure loss filter 120.

In this example, by using the electrostatic force, compared to the case of using only the inertia/interception/diffusion effect (Brownian effect), the collection performance of the $SO_3$ mist is improved.

Furthermore, by using the electrostatic force, compared to the case of using only the inertia/interception/diffusion effect (Brownian effect), the mist collection/agglomeration apparatus 14 can be downsized.

Figure 7:
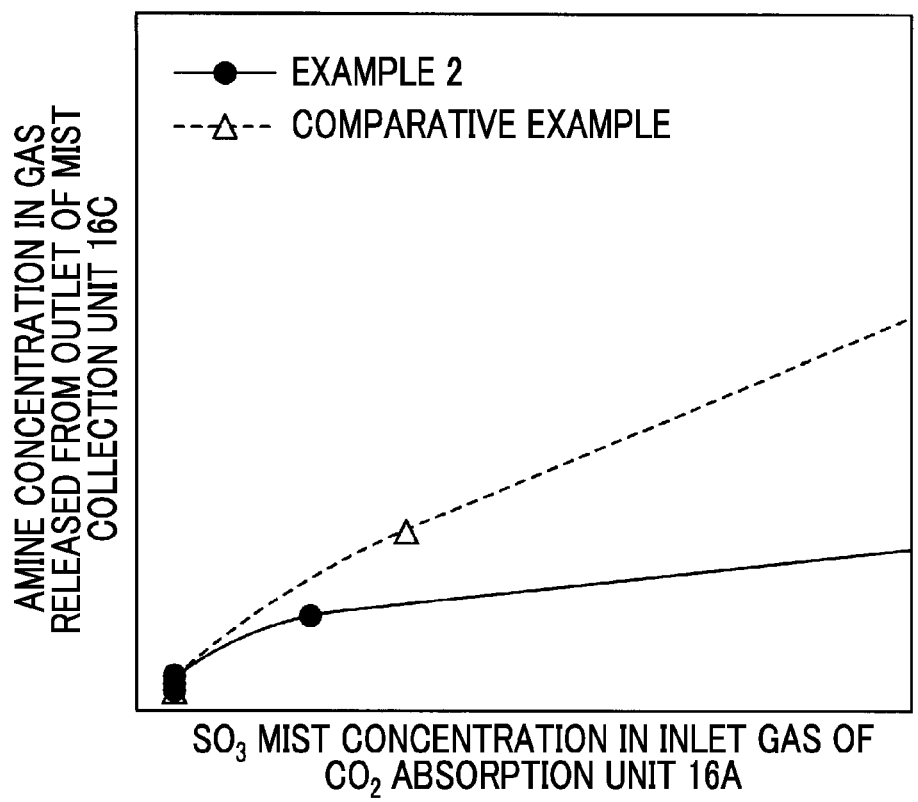
FIG. 7 is a diagram of the relationship between a $SO_3$ mist concentration in an inlet flue gas of a $CO_2$ absorption unit and an amine concentration in gas released from the outlet of a mist collection unit of a $CO_2$ absorption tower.

FIG. 7 is a diagram of the relationship between the $SO_3$ mist concentration in the inlet flue gas 12D of the $CO_2$ absorption unit 16A and the amine concentration in the gas released from the outlet of the mist collection unit 16C of the $CO_2$ absorption tower 16.

In the case of this example, it was confirmed that by providing the mist collection/agglomeration apparatus 14 using charging, a reduction in the amine concentration in the gas released from the outlet of the mist collection unit 16C of the $CO_2$ absorption tower 16 is smaller than that of a comparative example.

REFERENCE SIGNS LIST 10 flue gas treatment system
11 boiler
12A to 12F flue gas
13 desulfurization apparatus
14 mist collection/agglomeration apparatus
15 flue gas cooling tower
16 $CO_2$ absorption tower
16A $CO_2$ absorption unit
16B washing unit
16C mist collection unit
17 absorbent regeneration tower
18 $CO_2$ recovery apparatus
50 $SO_3$ mist
51 agglomerated $SO_3$ mist
53 $CO_2$ absorbent bloated mist

The invention claimed is:
1. A flue gas treatment method comprising:
forming agglomerated and bloated mist by causing particles of mist contained in flue gas from a wet desulfurization apparatus, which removes sulfur oxides in the flue gas from a boiler, to be bonded together and have bloated particle sizes;

causing the agglomerated and bloated mist to re-scatter and be introduced to a $CO_2$ absorption unit side which removes $CO_2$ contained in the flue gas by bringing a $CO_2$ absorbent on a gas flow downstream side into contact therewith;

forming $CO_2$ absorbent bloated mist bloated by the $CO_2$ absorbent being absorbed by the agglomerated and bloated mist; and collecting the $CO_2$ absorbent bloated mist by a mist collection unit.

2. The flue gas treatment method according to claim 1, wherein a flow velocity of the flue gas containing the re-scattering agglomerated and bloated mist exceeds a critical filtration wind velocity for mist collection.

* * * * *